INVENTOR.
ROBERT B. DODDS
BY Blair, Curtis & Hayward
ATTORNEYS.

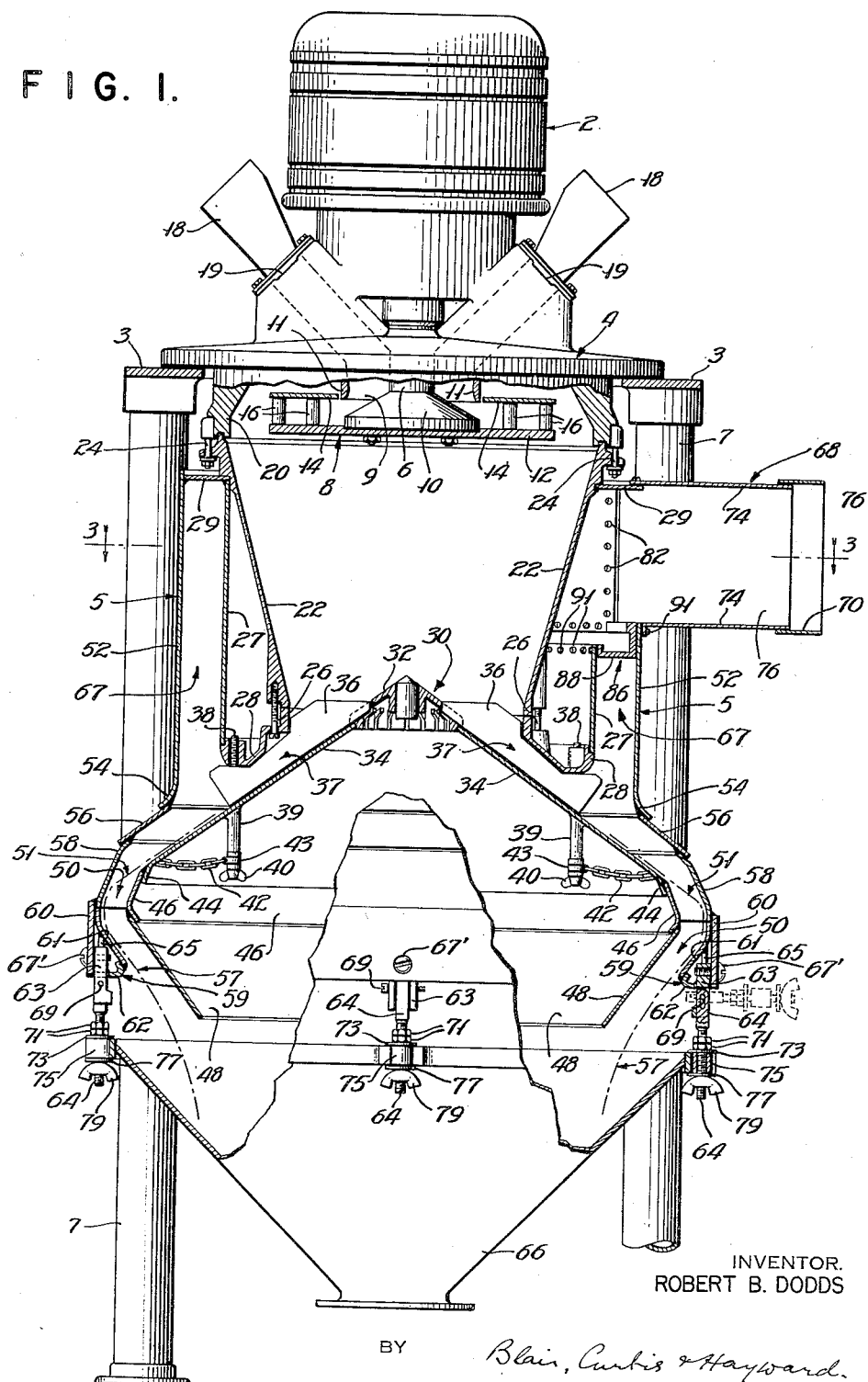

Patented Nov. 14, 1950

2,529,679

UNITED STATES PATENT OFFICE 2,529,679

SCOURER-ASPIRATOR AND METHOD

Robert Benjamin Dodds, Woodbridge, Conn., assignor to The Safety Car Heating and Lighting Company, Inc., a corporation of Delaware Application October 21, 1947, Serial No. 781,130

13 Claims. (Cl. 146—221.7)

This invention relates to the separation of the constituents of bulk products, such for example, as the removal of hulls from seeds or grain or the cleaning steps preliminary to milling grain or seeds. More particularly, this invention relates to cleaning cereals such as wheat by scouring and aspirating operations.

An object of this invention is to provide a method and apparatus for aspirating products in an extremely efficient dependable and practical manner. A further object is to provide for performing a hulling or like operation upon cereals or like products and immediately thereafter performing scouring and aspirating of the product. A further object is to provide for carefully controlled scouring and aspirating of the product. A further object is to provide for continuous processing of materials in the above-mentioned manner so as to attain superior results. A further object is to provide for impacting and scouring, or otherwise centrifugally treating products, and immediately thereafter subjecting the products to an aspirating action. A still further object is to provide apparatus for carrying out the above which is compact and simple in construction, light in weight and inexpensive to manufacture and maintain.

Another object is to provide apparatus for performing certain operations, such as steps preliminary to milling, in such a manner that certain constituents are released and are immediately removed from the product. A further object is to provide for the treating of grain or cereals such as wheat, so as to break up infested kernels and destroy all insect life, and also so as to release dirt, beeswing, light bran particles, and the like; and, to immediately thereafter removed from the stream the insect remains as well as the dirt, beeswing, etc. A further object is to provide an extremely efficient mode of aspirating cereals, cereal products, and the like. A still further object is to provide for the removal of constituents from bulk products with a minimum quantity of air. These and other objects will be in part obvious and in part pointed out below.

The invention accordingly consists in the features of construction, combinations of elements, arrangements of parts, and in the several steps and relation and order of each of the same to one or more of the others, all as will be illustratively described herein, and the scope of the application of which will be indicated in the appended claims.

In the drawings, in which is shown one embodiment of the invention:

Figure 1 is a partial front elevation and partial vertical section showing one embodiment of the invention;

Figure 4:
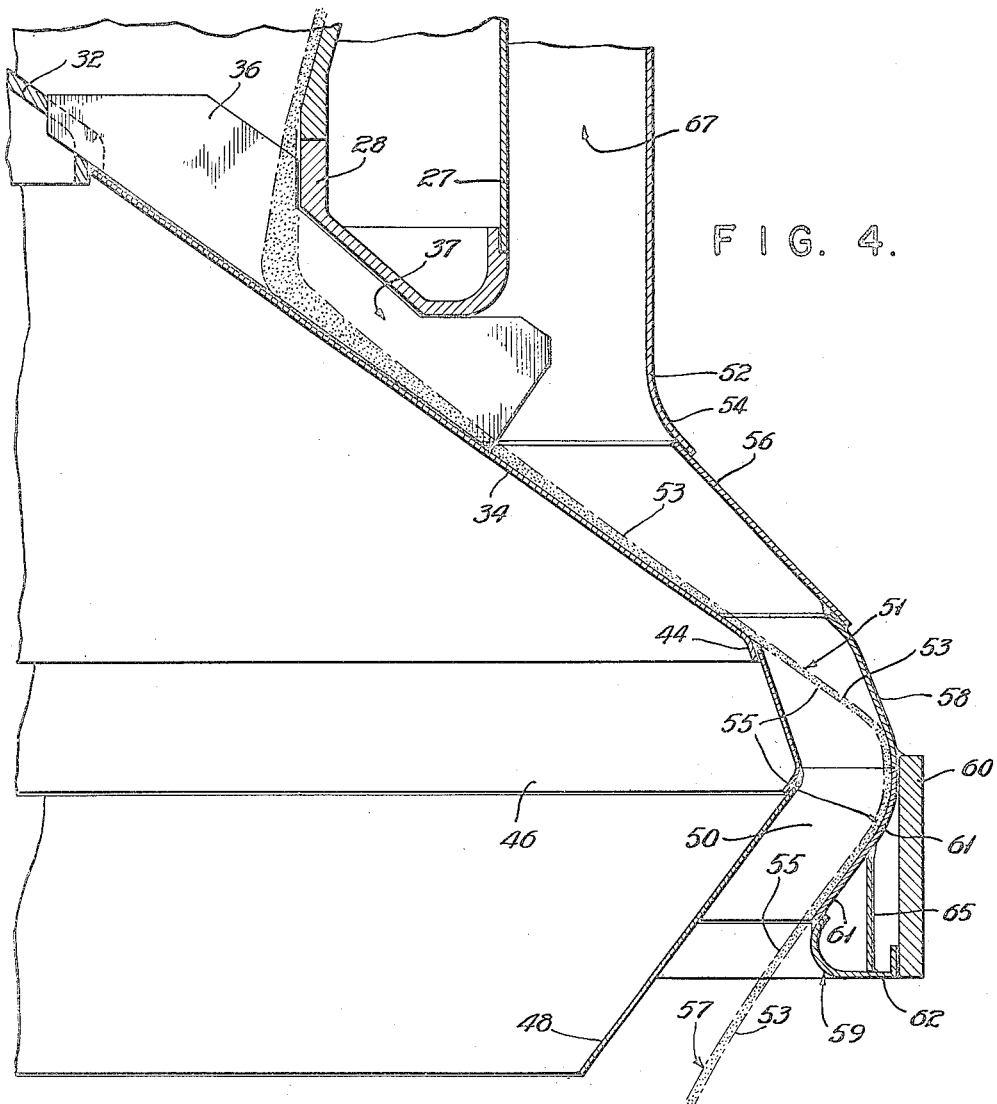
Figure 4 is an enlarged sectional view of a portion of the apparatus.

This invention relates to the invention covered in U. S. Patent No. 2,339,737, of George E. Hulse, and assigned to the assignee of the present application. In the above-identified patent there is disclosed a method and apparatus for treating bulk products for the destruction of all insect life. A portion of the apparatus of the illustrative embodiment of the present invention is the same as that disclosed in the above-identified patent. The present invention contemplates treating bulk products so as to break up certain product particles or so as to dislodge certain constituents, and then the product is subjected to a thorough aspirating action so as to separate out certain constituents or parts such as those of certain size and shape and specific weight.

In the illustrative embodiment of the present invention, apparatus of the same character as that shown in the above-mentioned patent is used to treat bulk products, such as those of the general class of cereals, and there is provided additional apparatus to perform further processing, including separating out light-weight and flaky particles by aspirating. Illustratively, wheat which has been tempered for milling is subjected to a centrifugal impacting action which breaks up kernels having insect life in them and kills all insect life, and there is a scouring effect which knocks loose the crease dirt, external dirt, and some bran and beeswing.

After this impacting operation, the product is discharged in an annular, whirling stream into the top of a frusto-conical wall which converges downwardly. This stream of the product is accompanied by air which also whirls, and the stream of the product and air moves downwardly in a slightly converging cyclonic path with the result that the product slides along the surface of the enclosing wall in a helical path. This sliding results in a further scouring so that a very substantial portion of the dirt is released from the kernels.

The rotary motion of the product and the accompanying air is then arrested and the product and the air are directed radially outwardly through an annular outlet opening. At this outlet opening there is a reduction in air pressure so that the air accompanying the product flows through the opening rapidly and at an increasing rate of flow. After passing through the opening, the air is drawn upwardly; whereas the product flows downwardly and radially outwardly along a sloping annular surface. During the stopping of the rotary motion of the product and the air, there is some turbulence in the flow. At the same time, the stream of the product passes downwardly across the mouth of the outlet opening while the air is passing into the opening so that the air path crosses that of the product. These various factors cause the air to pick up the light flaky particles of the product and these particles are carried away with the air so that there is an aspirating action at this outlet opening.

The product then slides by the action of gravity in a thin, compact annular stream down a cone and is projected across the main aspirating gap while maintaining the thin, compact, annular stream condition. Simultaneously a stream of air is drawn upwardly through this gap and through the stream of the product. This stream of air is sufficient to carry certain constituents or particles from the stream of the product, i. e., the dirt, light bran particles, beeswing, insect remains, etc. The air moves upwardly at a velocity sufficient to maintain in suspension all of the constituents which it takes from the stream, and these constituents are then separated from the air in a cyclone separator. The main stream of the product flows down by gravity for further processing.

The arrangement is such that the air flow is uniform and the annular stream of the product at the main aspirating gap is thin and of uniform thickness and compactness throughout and at all times. Thus, each portion of the product is subjected to the same aspirating action and this is controlled by regulating the air flow. In practice, the construction is such as to permit accurate control so as to remove greater or lesser amounts of the constituents as desired. That is, the uniform, thin stream of the product in the main gap facilitates accurate control of the aspirating action, and this action is increased or decreased by merely making the appropriate change in the amount of air flowing through the gap. The aspirating action is so uniform that it is feasible to use a very small quantity of air for the removal of the constituents. This is advantageous not only because of the economies of manufacture and operation, but also because it is possible to obtain better results when it is desirable to avoid the use of a heavy stream of air. For example, in the milling of flour it is desirable to maintain accurate control of moisture content and with some aspirating systems a large quantity of air is used and it tends to dry out the product; with the present arrangement, the quantity of air may be kept small enough to avoid objectionable drying out of the product.

Referring now to Figure 1 of the drawings, there is shown at the top an electric motor 2 mounted on a top casing structure generally indicated at 4 which is a part of the entire machine casing, generally indicated at 5. As indicated above, the structure forming the upper part of the apparatus of Figure 1 is the same as that of the above-identified patent. However, this structure will be explained here with sufficient detail to understand the present invention. The entire apparatus is supported by a flange on the top casing structure 4 which overhangs a supporting ring 3 supported by four posts 7 (see also Figure 3). Motor 2 (Figure 1) has a vertical shaft 6 extending downwardly into the casing through a product inlet opening 9 and fixed to the lower end of shaft 6 is a rotor 8. Rotor 8 has a hub 10 which has bolted to it an annular lower plate 12 upon which are mounted two rows of cylindrical impactors 16. Impactors 16 carry at their upper ends an annular upper plate 14, and the entire rotor is a rigid, balanced unit which is rotated at a controlled speed of, for example, between 1700 and 3500 R. P. M. The upper and lower annular plates 14 and 12 define an annular treatment zone through which the product flows during operation.

The product is delivered to the machine through two chutes 18 on the opposite sides of motor 2 which have slide valves 19 therein and direct the product against hub 10. A fixed cylindrical collar 11 extends downwardly within the inner periphery of plate 14 to direct the product down upon the hub 10 of the rotor. Thus, the product is delivered to the rotor by gravity and is directed against the hub. The rapid rotation of the rotor spreads the product out into a thin, annular, even stream which flows radially into the treatment zone. There, the product particles are impacted by impactors 16 and simultaneously there is imparted to them a rapid rotary movement so that they flow through the treatment zone along expanding spiral paths. The impacting action breaks open the defective kernels or berries so as to expose internal insect life and the action is such that all insect life in the product is destroyed. Furthermore, there is a scouring action which dislodges external dirt, crease dirt, light bran particles, and beeswing and the like, and the product thus treated is discharged from the periphery of the rotor with the accompanying air in a rotating, even, annular stream.

Surrounding rotor 8 is a casing ring 20 which is integral with the top casing structure 4 and bolted to this ring is a frusto-conical shell 22. Shell 22 is secured in place by six bolts 24 threaded in ring 20. At the bottom of shell 22 is a collar 28 which is attached to shell 22 by six stud bolts 26. For purposes which will be discussed below there is provided around shell 22 a cylindrical baffle 27 the upper edge of which is welded to an annular sheet metal wall 29 which rests against a ledge on shell 22. The lower edge of baffle 27 rests on a ledge in collar 28, so that the collar clamps this baffle and wall in place.

Collar 28 also carries a cone assembly, generally indicated at 30 which has a cast metal hub 32 forming its apex and a conical sheet metal wall 34 the upper edge of which is welded to the hub. Positioned between wall 34 and collar 28 are sixteen evenly-spaced, radial, sheet metal fins or baffles 36 (see Figure 3) the inner ends of which are received in slots in hub 32. These fins are welded to the cone assembly 30 and they project outwardly just beyond the periphery of collar 28 thus to provide between them sixteen radially and downwardly projecting passageways 37 for the product and the accompanying air.

The cone assembly 30 is rigidly supported from collar 28 by four bolts 38 having at their lower ends thumb nuts 40. Bolts 38 are threaded at their upper ends into the collar and extend through sleeves 39 which are welded to the bottom of wall 34. Thumb nuts 40 clamp against the lower ends of sleeves 39 so as to clamp the cone assembly firmly in place with baffles 36 resting tightly against collar 28. These nuts are turned from their bolts when it is desirable to remove the cone assembly. For convenience each of the thumb nuts is attached to the underside of wall 34 by a chain 42 which is welded to the wall and attached to the nut by a collar 43 fitting loosely in a groove in the nut.

At the bottom of wall 34 of the cone assembly there is a downwardly curved flange 44 and welded to this flange is a sheet metal connecting collar 46. The lower edge of connecting collar 46 extends inwardly and has welded to it a downwardly and inwardly extending frusto-conical shield 48. The lower portion of wall 34 of the cone assembly, connecting collar 46 and shield 48 form the inner wall of an annular aspirating passageway 50 the outer wall of which is formed by the bottom portion of casing 5.

As pointed out above, the top of casing 5 is formed by the top casing structure 4; directly beneath this is a sheet metal cylindrical casing member 52 which surrounds baffle 27 and has its upper edge welded to the outer periphery of casing wall 29. Thus, baffle 27, casing wall 29 and casing member 52 form a rigid structure which is supported by shell 22 and collar 28. As will be discussed more fully below, this rigid structure defines an annular passageway 67 for the outflowing air, and in addition this structure provides support for the other external wall and casing members.

The lower edge of casing member 52 is bent outwardly at 54 and has welded to it a downwardly and outwardly-sloping frusto-conical casing member 56 which is substantially parallel with wall 34 of the cone assembly. Welded to the bottom edge of member 56 is a casing member 58 which surrounds connecting ring 46 of the cone assembly; and surrounding and welded to the lower edge of casing member 58 is a reinforcing ring 60.

Ring 60 provides reinforcement and support for a deflecting assembly generally indicated at 59 and including a deflecting member 61, a baffle flange 62, and four forked brackets 63 which are welded to the outer wall of member 61 and to the baffle flange 62. There are also four internal sheet metal reinforcing members 65 each of which is substantially one quarter of a cylinder. Members 65 are positioned between brackets 63 so as to form substantially a cylinder, and are welded at their top edges to member 61 and at their bottom edges to baffle flange 62. The deflecting assembly 59 is a removable unit which is held in place by four screws 67' which project through holes in ring 60 and are threaded into the respective brackets 63. When positioned within ring 60 the upper edge of member 61 abuts the lower edge of member 58 so that their surfaces are flush and a smooth annular inner deflecting surface is provided.

Each of brackets 63 has a forked lower extension and extending between its forks is a screw 69. Each of screws 69 supports a swinging bolt 64 there being an elongated opening through the bolt through which the screw extends. Bolts 64 cooperate to support a hopper 66 which receives the treated stream of the product and directs the stream downwardly to a conduit (not shown). Each of bolts 64 has on its threaded lower end a pair of nuts 71, an upper washer 73, a spacing collar 75, a lower washer 77, and a thumb nut 79.

Hopper 66 has at its upper edge a rim which has four open slots into each of which one of the collars 75 is positioned, and the thumb nut 79 is tightened up so as to clamp the adjacent portion of the hopper rim between washers 73 and 77. Each pair of nuts 71 is locked together so that when thumb nuts 79 are tight the hopper is held securely in position. The hopper is removed by loosening thumb nuts 79 and then swinging bolts 64 outwardly from their respective slots in the hopper rim. As shown in broken lines, each of these bolts may be swung up and out to a horizontal position and then slid on its screws 69 toward shield 48 so that it is held in the horizontal position by engagement between the top of the bolt and the baffle flange 62. The spacing between the upper edge of the hopper rim and baffle flange 62 is determined by the positioning of nuts 71, and is such that a free-flowing stream of air enters the bottom of the aspirating passageway 50. The shape and relationship of the various parts is such that eddy currents are avoided and there is no substantial tendency for the air to divert the down-flowing stream of the product.

Members 56, 58 and 61 are the portions of casing 5 which form the outer wall of the aspirating passageway 50, referred to above, the inner wall of which is formed by the surface of the cone assembly 30. As will be more fully pointed out below, the thin, compact annular stream of the product flows down the top of wall 34 and is projected from the lower edge of wall 34 across the main aspirating gap 51 and is intercepted by member 58. Thus, the main aspirating gap has at its inner periphery the lower edge of wall 34 and it has at its outer periphery the annular portion of member 58 which intercepts the stream of the product. This portion of member 58 slants outwardly and downwardly so that the stream of the product is deflected downwardly in a smooth manner so that a compact stream condition is maintained.

The path of the product stream is indicated in Figure 1, but is shown more clearly in Figure 4 where the upper or outer surface is indicated at 53 and the lower or inner surface is indicated at 55. The stream is guided by the outer surface of the aspirating passageway and the flow is such that product particles do not tend to leave the main stream. Thus, there is a free passageway for the upflowing air between the outer surface of the cone assembly and the inner surface 55 of the stream of the product. The stream of the product is deflected inwardly by deflecting member 61 so that the stream flows downwardly to hopper 66, as indicated.

Figure 2:
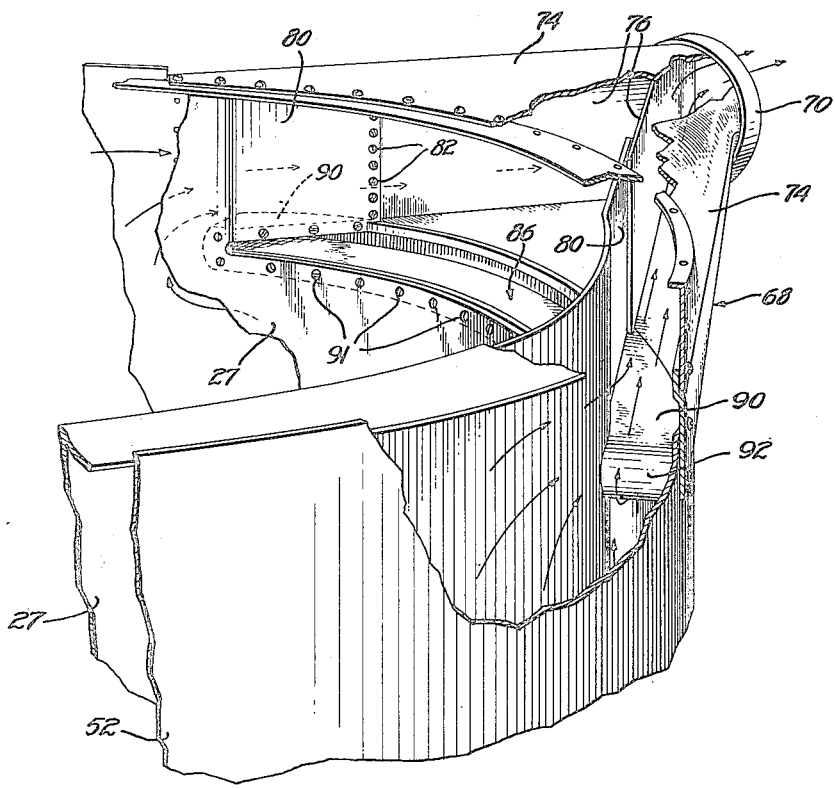
Figure 2 is a perspective view with parts broken away showing a portion of the apparatus of Figure 1.
Figure 3:
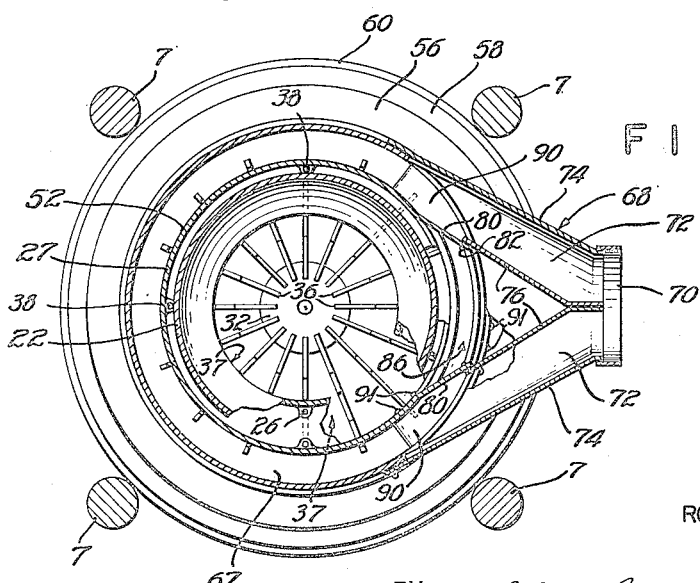
Figure 3 is a horizontal section on the line 3—3 of Figure 1.

As indicated above, extending upwardly from the top of the aspirating passageway 50 is an annular passageway 67, which is formed by casing member 52 and baffle 27 and (Figure 1) by the casing wall 29; these members are all welded together at the top. Baffle 27, casing member 52 and wall 29 cooperate to provide a support for a radially projecting suction header or air discharge assembly 68 the structure of which is best shown in Figures 2 and 3. Assembly 68 has at the right a cylindrical conduit connection 70 which is connected to a suction conduit or blower (not shown), and is connected to passageway 67 through two diverging passageways 72 which are similar and of complex shape. At connection 70, each of these passageways is semi-circular in vertical cross-section; and, at its opposite end, each passageway is rectangular in cross section, and is connected tangentially to passageway 67. Each of passageways 72 has an outer wall 74 and an inner baffle wall 76. The two walls 74 join above and below baffle walls 76 so as to form a closed outer casing. Baffle walls 76 are connected together at their ends adjacent connection 70 and they diverge at their other ends toward a tangential relationship with respect to baffle 27. The sheet metal which forms baffle 27 is cut away between the ends of the two passageways 72 and adjacent each of the passageways there are portions 80 of this sheet metal which are bent outwardly into the respective planes of baffle walls 76 and are attached to these baffle walls by screws 82.

Positioned between casing member 52 and baffle 27 and directly beneath passageways 72 is a cast metal reinforcing baffle 86. As shown best in Figure 1, baffle 86 is channel shaped and has a bottom wall 88 which blocks off the top of passageway 67 throughout the arc (see Figure 3) between the openings from passageway 67 to passageways 72. Baffle 86 also has at each end a top wall 90 which forms the bottom wall of the adjacent end of the respective passageway 72. Walls 90 are connected to the respective ends of bottom wall 88 by semi-cylindrical end walls 92 (Figure 2). Baffle 86 has attached to it by screws 91 the adjacent edges of baffle 27, casing member 52, and outer walls 74.

With the blower (not shown) drawing air out through connection 70 there are two equal streams of air drawn through passageways 72 from the top of passageway 67; and there is substantially equal suction at all points around the lower end of passageway 67. Thus, at the bottom of passageway 67, evenly distributed streams of air are drawn out through passageways 37 and also upwardly through the aspirating passageway 50; and, as is discussed more fully below, a thorough and dependable aspirating action is obtained upon all of the product.

The operation will now be discussed more in detail in connection with the treating of tempered wheat in the manner discussed to some extent above. It is been pointed out above that when the rotor is rotating at the proper speed the defective kernels are broken, dirt is dislodged, some of the light bran particles and beeswing are removed, and all of the insect life is destroyed. The treated product is discharged at the periphery of the rotor in a rotating stream accompanied by a stream of air. The inner surfaces of casing ring 20, shell 22 and collar 28 are such that a substantially unbroken annular surface is provided which encloses the space for the rotor and the space beneath the rotor. Thus, the treated product which is projected from the rotor in the manner outlined above in a rapidly-rotating, annular stream is directed downwardly by casing ring 20 and flows in a helical path downwardly and slightly toward the axis with there being a continued rapid rotary movement.

The air which accompanies the product is also rotating and the rotary movement throws the product from the air against the confining surfaces of casing ring 20 and shell 22 into a thin, even stream. This stream slides along a helical path down shell 22, and during this downward movement, the product is subjected to some further scouring action so that at the bottom of the shell the product is in fact composed of a number of different constituents, which may include solid and cracked kernels or berries, the released dirt, the parts of the broken defective kernels and mutilated insect life and insect parts.

At the bottom of member 22 the product has lost some of its rotary movement, but it is still moving in a rotating annular stream with the result that each of baffles 36 arrests a segment of the stream and diverts it downwardly and outwardly through its adjacent passageway 37. Referring to the upper portion of Figure 4, the segment of the stream entering each passageway 37 flows downwardly across the mouth of the passageway onto wall 34; at the same time, the rotary movement of a segment of the air is stopped by the same baffle 36 and is directed into this same passageway 37. Thus, the path of the air crosses that of the product and there is some turbulence in the product flow as well as in the air flow. Rotor 8 acts as a blower and builds up a pressure within shell 22, and this combined with the reduced pressure condition in passageway 67 causes a pressure drop at passageways 37. Therefore, after passing through the product, the air is expanded and flows at an increasing velocity into passageway 67, and carries with it lightweight flaky constituents of the product. The constituents thus removed pass upwardly through passageway 67 so that the product is subjected to a preliminary aspirating action.

The various streams of the product flowing through passageways 37 are of the same size and the streams spread out evenly so that an annular stream covers the entire surface of wall 34. The thickness of this annular stream flowing down wall 34 decreases due to the increasing diameter and rate of flow of the stream. The movement is by gravity and is sufficiently rapid to cause the thin annular stream to be projected across the main aspirating gap 51 with surfaces as indicated at 53 and 55. The stream is diverted downwardly by member 58 and it flows along the outside of passageway 50, and at the bottom of the passageway, is directed inwardly and falls into hopper 66 and is discharged from the bottom of the hopper through a spout not shown.

As indicated above, the annular opening between the top of hopper 66 and baffle flange 62 is such that there is a free, even flow of air into the bottom of the aspirating passageway 50 and this first flows through the stream of the product without turbulence and without interfering with the product flow. The air flows upwardly through the passageway 50 and passes through the stream at the main gap 51 where the main aspirating effect is obtained. The rate and amount of flow of the product does not vary and the product is evenly distributed throughout the annular extent of the stream. Furthermore, the stream is fairly compact even while passing across the main aspirating gap, and offers at the gap unvarying resistance to the passage of air upwardly therethrough. These uniform conditions insure a uniform aspirating action for each portion of the product.

During the aspirating action the flaky lightweight particles are picked from the stream of the product and are entrained in the stream of air. By providing a thin stream substantially all such particles up to, and including those of a predetermined size and specific weight are withdrawn from the stream. By increasing the amount of air which flows there is produced a corresponding increase in the rate of air flow within the aspirating gap and therefore product particles of larger size and greater specific weight are entrained in the stream of air. In this way, accurate control is obtained upon the class of constituents which are removed from the stream of the product by merely changing the rate of air flow. In the present embodiment the arrangement is such and the operation is so controlled as to remove the dislodged dirt, the small bran particles and beeswing, and insect parts.

The air from the aspirating passageway 50 with the removed constituents entrained is drawn upwardly through passageway 67 and thence outwardly through passageways 72 and connection 70 by a blower (not shown). As has been explained above, the product passing through the rotor is accompanied by a stream of air and this air performs a preliminary aspirating of the product as the air and product pass through passageways 37. The apparatus is so constructed and arranged that the air from passageways 37 is carried away, and at the same time, the desired air flow is maintained in passageway 50.

In the illustrative embodiment, the product particles move across the main aspirating gap 51 somewhat spaced from each other so that in this gap the product particles occupy substantially one-half of the area of the gap and the aspirating air flows between the product particles through the remainder of this area. The length of this gap is such that the area of the stream of the product through which the air is passing at this gap is substantially twice the area of passageway 50 above this gap. Therefore, the air flows between the product particles in the gap at substantially the same rate that it flows upwardly through passageway 50. This insures that product particles will not be picked up by the air stream in the gap and then dropped out above the gap as would be true if the rate of air flow were greater within the gap than above it. The increased length of gap is obtained by projecting the stream of the product at an angle across the stream of air and this angle may be changed as is required to meet the conditions of use.

It has been pointed out above that the aspirating action in passageways 37 depends upon the air which flows through the rotor and thence through these passageways. When the inlet chutes 18 are relatively small or when slide valves 19 are partially closed, the stream of the incoming product blocks the chutes so that the only air which flows through the rotor and through passageways 37 is that which fills the spaces between the kernels. However, the product normally flows freely through chutes 18 and the flow of air with the product depends to a large extent upon the suction pressure in passageway 67 and upon the position of valves 19. Therefore, assuming that the suction pressure in passageway 67 to be constant, slide valves 19 may be opened or closed to increase or decrease the amount of air which enters the machine with the product, and this controls the aspirating effect in passageways 37.

As explained above, the position of hopper 66 is such that there is a free flow of air into the bottom of passageway 50. Therefore, the ratio between the size of the stream of air which flows through the rotor and passageways 37 and the size of the stream of air which flows through passageway 50 and the main aspirating gap 51, is controlled partly by the design of the apparatus, but also the adjustment of slide valves 19. When once the desired ratio between these two streams of air is determined, the aspirating effect is then controlled by adjusting the suction pressure at connection 70 (and therefore in passageway 67).

Some change in the aspirating action even in the main aspirating gap is obtained by changing the adjustment of slide valves 19 because this changes the air flow through passageways 37 and causes a change in the suction pressure in passageway 67. Therefore, from a practical standpoint the operator has available as the control for the aspirating action the adjustment of the suction pressure at connection 70, and he also may use slide valves 19 as an additional means to adjust the overall aspirating effect.

The extremely even distribution of the material permits thorough aspirating of the product with the use of a relatively small amount of air. Furthermore, under normal operation the size of the stream of the product is relatively constant so that the resistance to air flow does not vary; this permits adequate adjustment of the suction pressure to give ideal operation. The construction of the illustrative embodiment is such that it may be adjusted for a wide variety of uses, and conditions, and the aspirating action can be kept within the limits desired.

The aspirating of the product follows the impacting and scouring actions before the product has been mixed excessively. This prevents a difficulty which has been encountered previously under some conditions of operation wherein dirt or other constituents were freed from the kernels or the like where they first adhered only to be mixed with and caused to adhere to other kernels or like particles again. With the arrangement here under discussion the products are separated into their constituents so that contamination or other constituents are removed immediately after the scouring operation is completed.

A very important phase of the present invention is the extremely accurate control of the aspirating action, and, in connection with this the distribution of the annular stream of the product is quite important. In the illustrative embodiment of the invention, the product is subjected to a controlled impacting action within the rotor so that dirt is released, insect life is destroyed, defective kernels are broken open, etc. However, the rate of rotation of this rotor may be changed so as to reduce or increase the impacting action; in addition to this change in the mode of operation, the present invention contemplates the use of other types of rotors to obtain other specific treating effects, and also the use of other devices which will distribute the product evenly throughout the aspirating zone.

Under some circumstances the flow of air and product at the bottom of passageway 50 may be such that there is an additional aspirating action at the bottom of this passageway. That is, the annular stream of air enters this passageway between the top of hopper 66 and the baffle flange 62, so that the stream of the product may be considered as passing across a secondary aspirating gap 57 which is between baffle flange 62 and hopper 66. Here the air passes through the stream at surface 53 and out of the stream at surface 55; whereas, in the main gap 51 the air flows into the stream at surface 55 and out of the stream at surface 53. Thus, the flow of air through the product stream at gap 57 is opposite to the flow of the air through the stream at gap 51. Therefore, if the conditions are such that some light, flaky particles are not caught by the air in gap 51, they may be caught by the air flowing oppositely in gap 57.

The present invention contemplates also the deflecting of the stream of the product from deflecting member 61 at such an angle that the stream of the product is intercepted by shield 48. Under such circumstances the shield would direct the stream of the product downwardly to the hopper and the secondary aspirating gap 57, referred to above, would be somewhat similar in area to the main aspirating gap 51. The aspirating action in this aspirating gap 57 would be somewhat as described above.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus for treating bulk products, the combination of, means forming a casing having a product-inlet opening at the top and a product-discharge opening at the bottom, a rotor mounted within said casing beneath said inlet opening and adapted upon rotation to subject the product particles to an impacting action against the side of said casing and to impart to the product particles rapid rotary movement, an inwardly tapering scouring shell mounted beneath said rotor and adapted to receive the product as it is discharged from said rotor and to direct the product downwardly in a thin unimpeded annular stream, conical surface forming means forming with the bottom of said shell an annular product-directing chute including baffle structure to stop the rotary movement of the product and to direct the product downwardly and radially-outwardly, means forming an annular aspirating passageway exteriorly of said shell and including an annular aspirating gap at the exit end of said chute and across which said product flows, and means to flow a stream of air upwardly through said aspirating passageway and through said product at said gap.

2. In apparatus for treating bulk products such as cereals, the combination of, a casing construction housing a rotor for distributing the product, a scouring chamber located beneath said rotor and shaped to direct the product from its bottom in a comparatively heavy stream, a downwardly extending stationary shell substantially conical in shape located beneath said scouring chamber and providing a travel surface for gradually thinning said product stream, said shell having a plurality of baffles associated therewith for interrupting the rotary movement of said product, said casing construction forming with said shell a gap across which the thin stream of said product flows, means providing a passageway through which air may flow to meet the product passing across said gap, said casing construction and scouring chamber forming an air-withdrawing passageway above said gap exteriorly of said chamber, and a baffle to facilitate the even flow of air upwardly through the annular passageway, said baffle including an arcuate member mounted in said passageway which blocks a portion of the air-withdrawing passageway directly beneath an outlet at the top of said passageway.

3. In the art of treating cereal products such as wheat, the steps of, imparting to the product particles a high velocity rotary movement and impacting the particles so as to break open particles having insect infestation therein and to destroy all insect life, discharging the product in a thin uniform annular stream, directing the annular stream downwardly and radially inwardly while permitting continued rotary movement of the product and the accompanying air and scouring the product particles during such continued rotary movement, arresting only the rotary movement of the particles and accompanying air and directing the particles in a thin even stream of a thickness approximating a single layer of the product particles downwardly and radially outwardly across an annular aspirating gap, and flowing a uniform velocity stream of air upwardly through the stream of the product as it flows across said gap so as to remove from the stream of the product lighter weight undesirable constituents.

4. The art as described in claim 3, which includes withdrawing the air which accompanies the product through the treatment zone along a path whereby it intercepts the stream of the product prior to the time the product reaches said aspirating gap, whereby the product is subjected to a preliminary aspirating action.

5. In apparatus of the character described, in combination, a treating rotor for a product treating machine, said rotor including a plate and a hub, said plate having a plurality of spaced product engaging members secured thereto and extending upwardly therefrom, means secured to said hub for rotating said rotor at a high rate of speed, whereby product particles fed to said rotor are subjected to centrifugal action so as to be projected outwardly of said hub in an annular stream, a liner ring surrounding said rotor and having portions against which said particles are projected, said portions being inclined outwardly relative to the trajectory of said particles to impart to them a component of downward movement, whereby said projected particles comprise an annular downwardly directed swirling stream, said rotor and said liner ring constituting a product treatment zone wherein the individual product particles are treated and any infestation carried thereby is subjected to destructive impact, a product receiving shell disposed below said rotor to receive and scour said swirling stream of particles from said liner ring, means including a stationary outwardly flaring member having a portion extending into said shell to receive said stream and forming an aspirating passageway including an annular generally horizontal aspirating gap across which said particles flow, and means to flow a stream of air upwardly through said aspirating gap and passageway and through the stream of product particles at said gap.

6. Apparatus according to claim 5, wherein the last-mentioned means includes an annular passage extending upwardly from said aspirating gap and connected thereto and being disposed around said shell, means forming an outlet passage at the upper end and at one side of said annular passageway, and a baffle including an arcuate member mounted in said passageway below said outlet opening to block a portion of said annular passageway directly beneath said outlet opening.

7. Apparatus according to claim 5, wherein a plurality of spaced baffle members are disposed between said shell and said outwardly flaring member to arrest the rotary movement only of the product particles while permitting their even downward flow over the surface of said flaring member.

8. In apparatus of the character described, in combination, a vertically arranged product directing shell, an outwardly and downwardly flaring member located beneath said shell to receive the product stream flowing therethrough, means forming a vertical air passageway surrounding said shell and at least a portion of said flaring member, said means including a lower portion which forms with a portion of said flaring member an aspirating gap across which the product stream is directed by said flaring member in a thin uniform flow, means for drawing air upwardly through said passageway and said gap, said vertical passageway including an outlet opening at the upper end and at one side thereof, and a baffle mounted in said passageway below said opening to block a portion of said passageway directly beneath said opening.

9. Apparatus according to claim 8, wherein a plurality of spaced baffle members are disposed between said shell and said outwardly and downwardly flaring member to arrest any rotary movement of the product particles while permitting their even downward flow over the surface of said flaring member.

10. In apparatus of the character described, in combination, a treating rotor for a product treating machine, said rotor including a plate and a hub, said plate having a plurality of spaced product engaging projections secured thereto, means secured to said hub for rotating said rotor at a high rate of speed whereby product particles fed to said rotor are impelled by said product engaging projections so as to be projected outwardly of said hub in a thin annular high velocity stream, a liner ring surrounding said rotor and having portions against which said particles are projected, said portions being inclined outwardly relative to the trajectory of said particles to impart to them a component of downward movement whereby said projected particles comprise an annular downwardly directed stream, said rotor and said liner ring constituting a product treatment zone wherein the individual product particles are treated and infestation carried thereby is subjected to destructive impact, a product receiving shell disposed below said rotor to receive said stream of particles from said liner ring, means including an outwardly and downwardly flaring member underlying said product receiving shell to receive said stream, said means also including portions forming an aspirating passageway including an annular generally horizontal aspirating gap across which said particles flow, means to flow a stream of air upwardly through said aspirating gap and passageway and through the stream of product particles at said gap, said last-mentioned means including an annular passage extending upwardly from said aspirating gap and connected thereto and being disposed around said shell, means forming an outlet passage at the upper end and at one side of said annular passage, and a baffle in said passageway including a portion disposed below said outlet opening to block a portion of said annular passageway directly beneath said outlet opening.

11. Apparatus according to claim 10, wherein a plurality of spaced baffle members are disposed between said shell and said outwardly and downwardly flaring member to arrest any rotary movement of the product particles while permitting their even downward flow over the surface of said flaring member.

12. In apparatus for treating bulk products, the combination of, a casing having a product inlet opening at the top and a product discharge opening at the bottom, a rotor mounted within said casing beneath said inlet opening and having a product directing portion through which the product is projected with a rotary movement which distributes the product into an even annular stream, a shell mounted beneath said rotor and adapted to receive the rotating product as it is discharged from said rotor, baffle structure adjacent the lower portion of said shell to receive the product as it is discharged from said shell and to stop the rotary movement of the product, means forming a conical downwardly inclined surface underlying said baffle structure to direct the product downwardly and outwardly of said shell, means forming an aspirating passageway exteriorly of said shell and including an annular aspirating gap spaced outwardly from said baffle structure across which said product flows, and means to flow a stream of air upwardly through said aspirating passageway and through said annular stream of the product at said gap.

13. In apparatus for treating bulk products, the combination of, a casing construction having a product inlet at its top, a rotor mounted within said casing beneath said product inlet, a treating and scouring chamber located beneath said rotor and having an annular product outlet from which the product may rotatably flow, means forming with said casing an annular gap across which said product flows, means including baffle structure and a conical surface located between the bottom of said chamber and said gap for interrupting the rotary movement of said product and for directing the product radially outwardly and downwardly to said gap, a downwardly contracting baffle below said gap for directing the product downwardly into a hopper located below said baffle, and means forming a passageway for the flow of air through the stream of the product at said gap and including an annular product directing surface which directs the product downwardly and inwardly toward said baffle.

ROBERT BENJAMIN DODDS.

REFERENCES CITED

The following references are of record in the file of this patent:

UNITED STATES PATENTS

| Number | Name | Date |
|---|---|---|
| 255,747 | Wolf | Mar. 28, 1882 |
| 348,754 | Likins | Sept. 7, 1886 |
| 492,720 | Frey | Feb. 28, 1893 |
| 854,757 | Peacock | May 28, 1907 |
| 868,675 | Lockwood | Oct. 22, 1907 |
| 940,469 | Middleton | Nov. 16, 1909 |
| 997,372 | Cornwall | July 11, 1911 |
| 1,355,596 | Emerick | Oct. 12, 1920 |
| 1,457,110 | Gay | May 29, 1923 |
| 1,908,181 | Prouty | May 9, 1933 |
| 2,051,489 | Holland-Letz | Aug. 18, 1936 |

Certificate of Correction

Patent No. 2,529,679 November 14, 1950

ROBERT BENJAMIN DODDS

It is hereby certified that error appears in the printed specification of the above numbered patent requiring correction as follows:

Column 13, lines 63 and 64, for "passageway" read *annular passage*; and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*